(12) United States Patent
Hogan

(10) Patent No.: US 11,549,792 B2
(45) Date of Patent: Jan. 10, 2023

(54) DETACHABLE TRACKING DEVICE FOR A HUNTING ARROW

(71) Applicant: Marc R. Hogan, Canton, GA (US)

(72) Inventor: Marc R. Hogan, Canton, GA (US)

( * ) Notice: Subject to any disclaimer, the term of this patent is extended or adjusted under 35 U.S.C. 154(b) by 385 days.

(21) Appl. No.: 16/791,063

(22) Filed: Feb. 14, 2020

(65) Prior Publication Data

US 2020/0263965 A1 Aug. 20, 2020

Related U.S. Application Data

(60) Provisional application No. 62/806,049, filed on Feb. 15, 2019.

(51) Int. Cl.
| | |
|---|---|
| *H04W 4/029* | (2018.01) |
| *F42B 12/38* | (2006.01) |
| *A01M 31/00* | (2006.01) |
| *F42B 12/36* | (2006.01) |
| *G01S 1/02* | (2010.01) |

(52) U.S. Cl.
CPC .......... *F42B 12/385* (2013.01); *A01M 31/00* (2013.01); *F42B 12/365* (2013.01); *G01S 1/02* (2013.01); *H04W 4/029* (2018.02)

(58) Field of Classification Search
CPC .... F42B 12/385; F42B 12/365; H04W 4/029; A01M 31/00

USPC ......................................................... 342/386
See application file for complete search history.

(56) References Cited

U.S. PATENT DOCUMENTS

| 5,294,131 A * | 3/1994 | Manske ................ F42B 12/362 |
| | | 473/578 |
| 10,443,991 B2 | 10/2019 | Emrich et al. |
| 2018/0142996 A1 * | 5/2018 | Wetzler ................. F42B 12/385 |

FOREIGN PATENT DOCUMENTS

WO  WO-2018055232 A1 *  3/2018 ............. G01H 3/125

* cited by examiner

*Primary Examiner* — Harry K Liu
(74) *Attorney, Agent, or Firm* — Reising Ethington P.C.; Scott A. Hogan

(57) ABSTRACT

A tracking device is configured to detach from a launched projectile to remain in an animal when the projectile proceeds completely through the animal. The tracking device can be attached to the end of an arrow shaft and provide the nock of the arrow. A decelerator such as a barb, an offset fin, or a reverse helical projection is provided to aid in detachment of the tracking device from the arrow shaft as it passes through the animal. The tracking device remains embedded in the animal so that the animal can be tracked instead of the arrow.

20 Claims, 5 Drawing Sheets

DETACHABLE TRACKING DEVICE FOR A HUNTING ARROW

TECHNICAL FIELD

The present disclosure is related generally to equipment used in game hunting and, more particularly, to arrows and other projectiles equipped with location tracking capability.

BACKGROUND

Hunting wild game using a bow rather than a gun is favored by hunters who enjoy the additional challenge due to the higher skill level required to aim and manually launch a lethal projectile toward the targeted animal. Bow hunting is also a quieter version of the sport, which has the advantage that other non-targeted animals are not spooked by gunfire, thereby decreasing the probability that these other animals will vacate the area and increasing the probability that the same hunter will see more than one animal, even if he has already shot at and missed others.

One disadvantage associated with bow hunting is that the animal rarely expires at the same location it was hit by the arrow. While a lethal rifle shot typically brings the animal down at the location the animal is hit, an accurate arrow shot, even a lethal one, usually results in the animal taking flight until it finally tires and expires at some distance from the location it was hit. The bow hunter then must usually climb down from an elevated vantage point and attempt to determine which way the animal ran, which can be difficult from the new vantage point on the ground. Further, this must be done quickly because the wounded animal is not likely to patiently wait for the hunter to climb down before it races off into the forest in a random direction.

U.S. Pat. No. 10,443,991 to Emrich et al. discloses a hunting arrow equipped with a signal transmitter, which allows a hunter to track an arrow after the arrow is shot at an animal. Unfortunately for hunters who use modern high-powered bows to launch their arrows, the arrow often proceeds entirely through the animal such that, after trekking through the woods to the location from which the arrow is transmitting a signal, the hunter is disappointed to find only his arrow lying on the ground with the animal having long since fled the scene.

SUMMARY

In accordance with various embodiments, a tracking device is configured to detach from a launched projectile to remain in an animal when the projectile proceeds completely through the animal.

In some embodiments, a projectile includes the detachable tracking device.

In some embodiments, the projectile is an arrow.

In some embodiments, the tracking device includes a transmitter configured to transmit a detectable signal.

In some embodiments, the tracking device includes a receiver configured to receive a signal transmitted from an electronic device.

In some embodiments, the tracking device includes a sound generator.

In some embodiments, the tracking device includes an accelerometer configured to detect when the projectile is launched and/or when the launched projectile hits the animal.

In some embodiments, the tracking device is configured for attachment to an end of a shaft of an arrow and includes a nock portion configured for operable engagement with a bow string used to launch the arrow.

In some embodiments, the tracking device includes an electronics portion that is housed within the shaft of the arrow when the device is attached to the end of the shaft.

In some embodiments, the tracking device includes a sleeve that fits along a housing of the electronics portion to define an outer diameter that fits with an inner diameter of the shaft of the arrow.

In some embodiments, the sleeve is removable and replaceable with a different sleeve to define a different outer diameter.

In some embodiments, the tracking device is configured such that a longitudinal force required to detach the tracking device from the shaft is greater than a force required to detach the nock portion from the bow string.

In some embodiments, the tracking device includes a decelerator configured to decelerate the tracking device relative to the projectile while the projectile is proceeding through the animal.

In some embodiments, the decelerator includes a barb.

In some embodiments, the decelerator includes an offset fin.

In some embodiments, the tracking device is configured for attachment to an end of a shaft of an arrow and comprises a nock portion having a body and a groove formed in the body for operable engagement with a bow string used to launch the arrow. The decelerator extends away from the body of the nock in a direction perpendicular with the groove.

In some embodiments, the decelerator includes a helical projection configured to cause the tracking device to rotate in a direction opposite from a direction of rotation of the launched projectile while the decelerator is proceeding through the animal.

In some embodiments, the decelerator includes a plurality of deceleration features extending radially from a body of the tracking device.

In some embodiments, the deceleration features are spaced about an axis of the tracking device with rotational symmetry.

In some embodiments, the decelerator surrounds a housing of the tracking device and fits between a shoulder of a nock and an end of an arrow shaft.

It is contemplated that any of the above-listed features can be combined with any one or more other of the above-listed features, with any of the features described in the below description, and/or with any of the features depicted in the drawings, except where there is an incompatibility of features.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Figure 1:
FIG. 1 is a perspective view of a bow hunter taking aim at a targeted animal.

FIG. 1 depicts a hunter taking aim at a targeted animal 10 with a weapon 12 configured to launch a projectile 14 toward the animal. In this example, the targeted animal 10 is a deer, the weapon 12 is a bow, and the projectile 14 is an arrow. The illustrated bow 12 is a compound bow but could alternatively be a recurve bow or a crossbow, to name a few examples. These teachings are also applicable to other projectile-launching weapons such as rifles, slingshots, harpoon guns, etc. and to their respective launchable projectiles.

Figure 2:
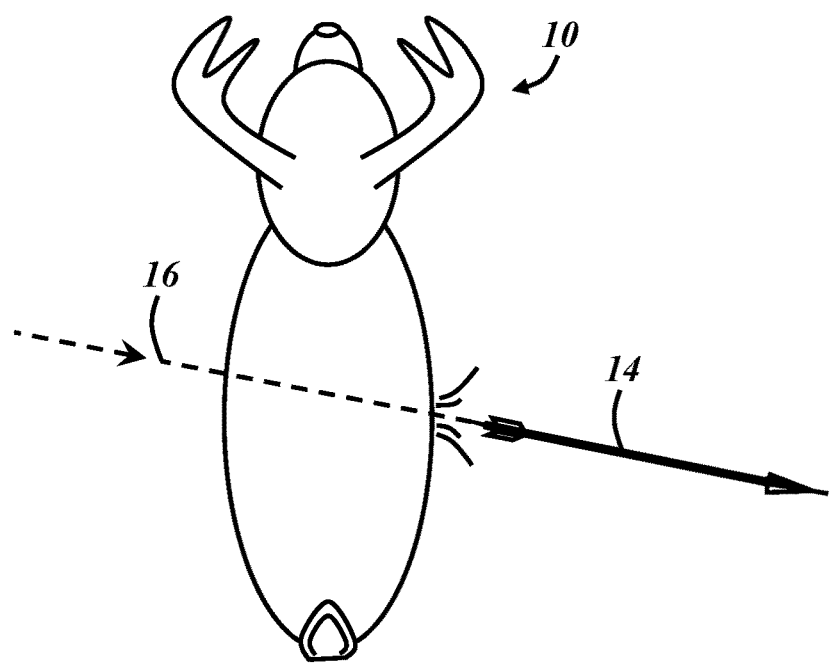
FIG. 2 is a schematic top view of a launched arrow and its trajectory toward and entirely through the targeted animal.

FIG. 2 is a schematic top view of the arrow 14 after being launched toward the animal 10, striking the animal, and passing entirely through the animal. A trajectory 16 of the launched arrow 14 is depicted as a broken line. FIG. 2 illustrates a problem with the use of tracking devices that are incorporated as part of the projectile 14. In particular, even if the targeted animal 10 is lethally wounded, such a tracking device will only lead the hunter to the launched arrow 14 when the arrow passes completely through the animal. Meanwhile, the wounded animal has likely fled the scene with no way for the hunter to find it.

Figure 3:
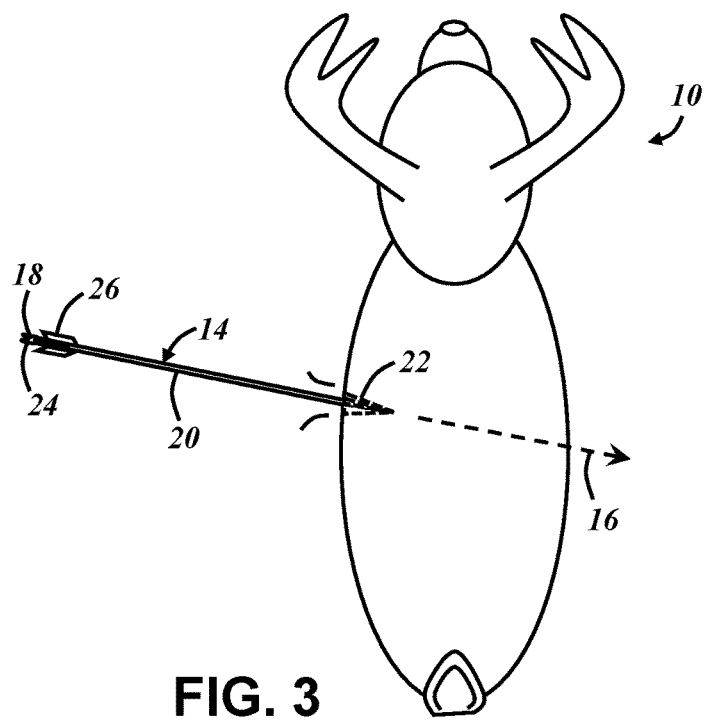
FIG. 3 is a schematic top view of the targeted animal illustrating an arrow equipped with a tracking device entering the animal.
Figure 4:
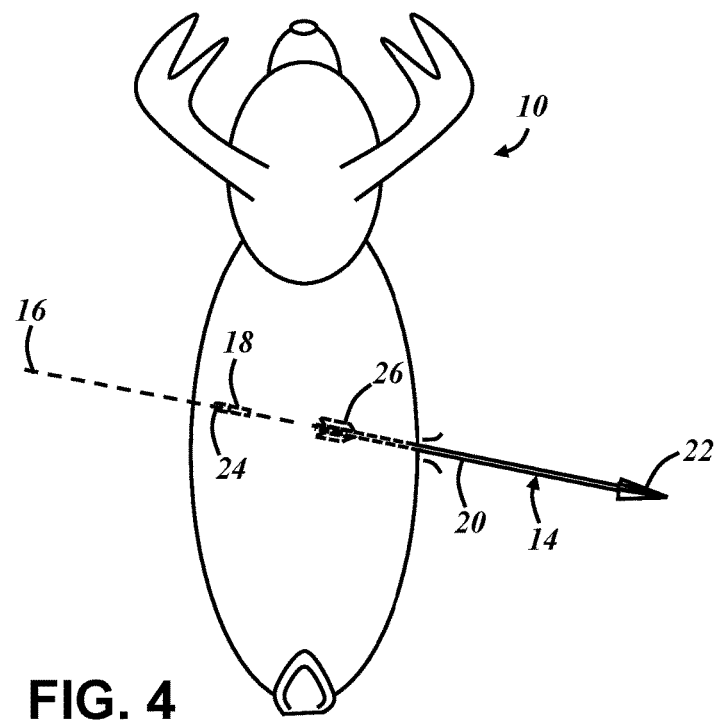
FIG. 4 is the view of FIG. 3 illustrating the arrow after the tracking device has detached.
Figure 5:
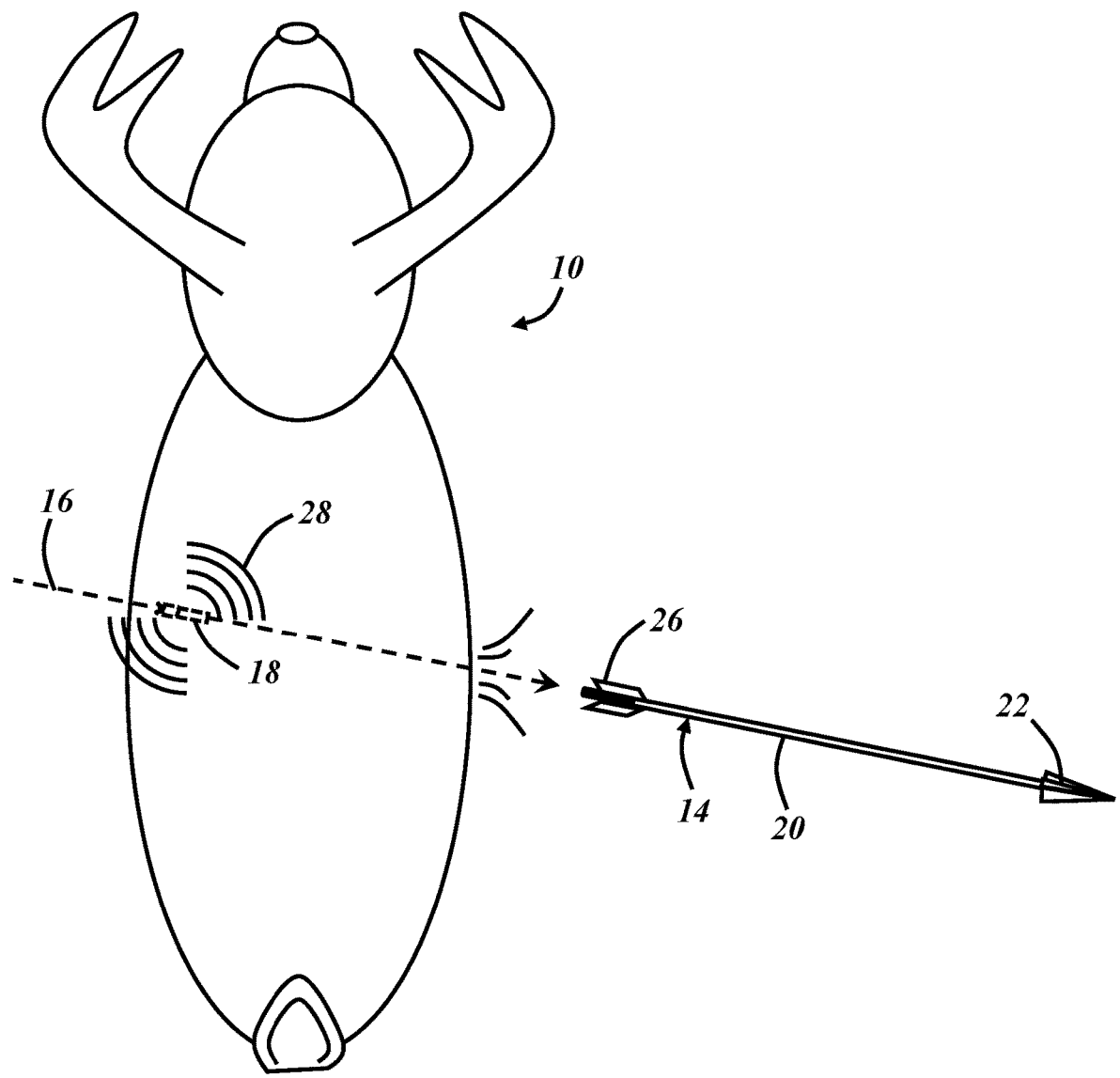
FIG. 5 is the view of FIGS. 3 and 4 illustrating the arrow exiting the animal without the tracking device, which remains in the animal to transmit a detectable signal.

FIGS. 3-5 are schematic top views of the targeted animal 10 sequentially illustrating an embodiment of a launchable projectile 14 comprising a tracking device 18 configured to detach from the launched projectile to remain in the animal when the projectile proceeds completely through the animal. The illustrated projectile 14 is an arrow that includes a shaft 20, a tip 22 at a front end of the shaft, a nock 24 at an opposite rear end of the shaft, and vanes 26 at the rear end of the shaft and forward of the nock. In this particular example, the nock 24 is provided by the tracking device 18.

In FIG. 3, the tip 22 of the arrow 14 has entered the animal 10 along the trajectory 16, while the nock 24, the vanes 26, and most of the shaft 20 have not entered the animal. FIG. 4 illustrates the arrow 14 after the tip 22 and a portion of the shaft 20 have proceeded through and exited the animal 10 at its opposite side. FIG. 5 illustrates the shaft 20, tip 22, and vanes 26 of the arrow 14 after proceeding completely through the animal. FIGS. 4 and 5 also illustrate the tracking device 18 lying along the trajectory 16 of the arrow 14 to remain in the animal 10 after detachment from the remainder of the arrow. FIG. 5 also depicts the tracking device 18 transmitting a detectable signal 28 from within the animal. The hunter can now begin detecting and/or tracking the animal 10 to determine its location, which is the location of the tracking device 18 and not the location of the remainder of the arrow 14 in this case.

Notably, the illustrated tracking device 18 is also useful if the projectile 14 does not pass completely through the animal 10—e.g., if the arrow only partially enters or exits the animal and thus travels with the wounded animal. This is because the tracking device 18 is configured to remain attached to the remainder of the arrow 14 until it encounters resistance to forward momentum that is greater than the resistance to forward momentum encountered by the remainder of the arrow.

Figure 6:
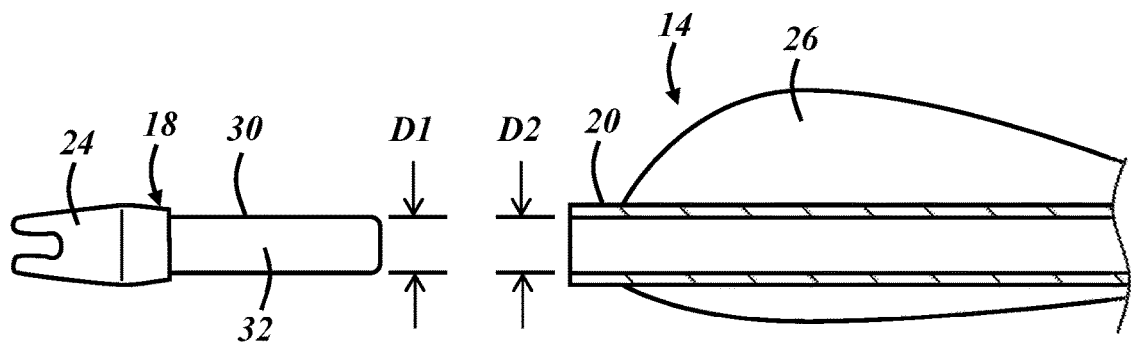
FIG. 6 is an enlarged top view of a rear portion of the arrow with the tracking device separate from the arrow shaft.

FIG. 6 is a top view of the detachable tracking device 18 illustrated with a cross-sectional view of the rear end of the arrow shaft 20 into which the tracking device fits. The illustrated tracking device 18 includes the nock 24 affixed to an electronics portion 30. The electronics portion 30 includes various electronic components contained within a housing 32. The housing 32 is hollow to support internal electronics such as a radio transmitter or transceiver, an accelerometer, a processor, a controller, a power source, etc. and may have a removable panel for accessing the electronics, such as to change the battery. The housing 32 is sized to fit in the end of the arrow shaft 20 such that an axial separation force required to separate the tracking device 18 from the shaft 20 is within a particular range. In particular, the separation force should be greater than the force required to separate the nocked arrow 14 from a bow string. The separation force between the tracking device 18 and the arrow shaft 20 may be greater than the weight of the fully assembled arrow 14. For example, for a 500-grain arrow weighing about 32.5 grams, the separation force of the tracking device 18 from the arrow shaft 20 should be greater than about 300 Newtons (0.7 lbf). The fit should be optimized so that the separation force is as low as possible while ensuring that the nock 24, and therefore the tracking device 18, stays with the arrow shaft when launched from the bow. Minimizing the separation force facilitates detachment of the tracking device 18 from the arrow shaft 20 as the arrow passes through the targeted animal.

In the example of FIG. 6, the housing 32 of the electronics portion 30 has an outer diameter D1 and the arrow shaft has an inner diameter D2. The relationship between these diameters affects the separation force of the tracking device 18 from the shaft 20. In one embodiment, D1 and D2 are sized to have a fit in a range between a location clearance fit and a tight transition fit as those terms are defined by the International Organization for Standardization (ISO). A location clearance fit will allow relative sliding or rotation of the joined components only when lubricated, and a tight transition fit permits manual (i.e., without tools) assembly and disassembly of the components.

Figure 7:
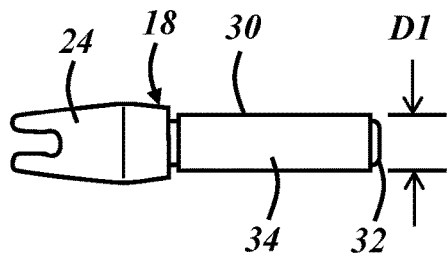
FIG. 7 is a top view of the tracking device equipped with a sleeve.

In the embodiment of FIG. 7, the tracking device 18 includes a sleeve 34 that fits along the housing 32 to define the diameter D1. The sleeve 34 may be removable and replaceable with a differently sized sleeve. Heavier arrows may have a higher nock-from-string separation force and may therefore require a higher tracking device-from-shaft separation force, and the sleeve 34 may be changed to one having a larger diameter D1, for example. The tracking device 18 can be provided as a kit including the nock 24 and electronics portion 30 along with a plurality of differently sized sleeves 34. In one embodiment, the housing 32 of the electronics portion is molded as a single piece with the nock 24.

In some embodiments, the housing 32, sleeve 34, or other component that defines the diameter D1, is made from a material having the same majority constituent as the material the inner diameter D2 of the shaft is made from. For example, if the shaft 20 is made from an aluminum alloy, then the housing 32 or sleeve 34 may be made from an aluminum alloy. If the shaft 20 is made primarily from carbon fiber, then the housing or sleeve may be made primarily from carbon fiber. If the shaft is aluminum with a carbon fiber wrap, then the housing or sleeve may be made from aluminum since the diameter D2 is defined by the aluminum. In some embodiments, the housing or sleeve is made from the same material as the shaft. This solves a problem discovered while developing the detachable tracking device 18, which is that changes in temperature affect the removal force of the tracking device from the arrow. For instance, if the housing 32 is made from an unfilled plastic material and has a tight fit with a carbon-based arrow shaft while the equipment is indoors, the tight fit may undesirably loosen when taken outdoors in cold weather, such as during winter hunting season in northern climates. This has been found to be due to the vast difference in coefficients of thermal expansion among certain materials. Some carbon-based shaft materials, for example, can have a near-zero CTE, while unfilled polymeric materials can a CTE up to 100 times that of carbon-based composites. Unfilled plastics can have a CTE up to 5 times that of aluminum alloys.

In cases, where it is impractical to make the housing of the detachable tracking device from the same material as the arrow shaft, the CTE of the housing material can be tailored to be within 1-30% of the CTE of the shaft material. For instance, if the shaft is made from an aluminum alloy having a CTE of $20 \times 10^{-6}$ K$^{-1}$, the housing material can be tailored to have a CTE as low as about $14 \times 10^{-6}$ K$^{-1}$ to as high as about $26 \times 10^{-6}$ K$^{-1}$ to be suitable for dimensional stability when undergoing temperature changes. Tailoring of the CTE of a polymer-based material can be achieved, for example, by the use of reinforcing fibers or filler materials such as fiberglass. Glass-filled plastics can thus be made to have a CTE similar to that of certain metallic materials, such as aluminum alloys.

Figure 8:
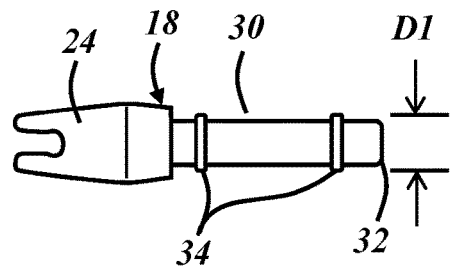
FIG. 8 is a top view of the tracking device equipped with O-rings.

In the example of FIG. 8, the sleeve 34 is in the form of one or more O-rings, and the housing 32 includes grooves into which the O-rings fit. The aforementioned kit may contain a selection of various sizes of O-rings to fine-tune the fit of the tracking device 18 to the arrow shaft.

The sleeve 34, or the housing 32 with no sleeve, may be made from or have an outer surface made from an elastomeric material, which provides a high coefficient of friction to increase the robustness of the fit between the tracking device 18 and the shaft 20 so that the tracking device will not fall out of the shaft or be detached from the shaft during launch. The elastomeric material may also elongate as separation force is applied, thereby thinning the wall thickness of the sleeve 34 or housing 32 and dynamically decreasing the diameter D1 to aid in the detachment of the tracking device 18 while passing through the animal.

Figure 9:
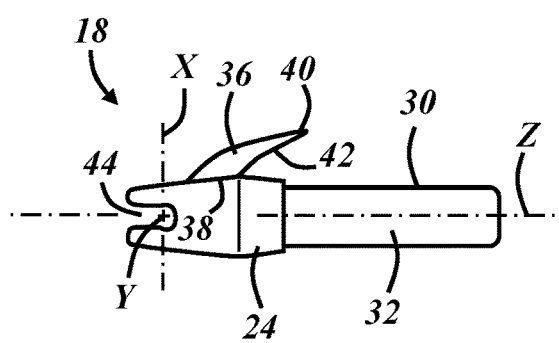
FIG. 9 is a top view of the tracking device equipped with a decelerator in the form of a barb.

To aid in separation of the tracking device 18 from the arrow shaft 20, the device may include a decelerator 36, some examples of which are provided in the following figures. In the example of FIG. 9, the decelerator 36 is in the form of a barb. The illustrated barb 36 is a tooth-like projection extending from a base 38 at the main body of the nock 24 to a pointed end 40 located forward of the base. A forward-facing surface 42 of the barb extends between the base 38 and the end 40 and is oriented to form an acute angle with respect to the shaft of the arrow. The barb 36 is located forward of a bow string-receiving groove 44 in the nock 24. The barb 36 may also be located along the nock 24 at an angular position that is offset by about 90 degrees from the axis (Y) along which the groove 44 is formed. These positional features help prevent the decelerator 36 from interfering with the bow string and/or with the fingers of the hunter while nocking the arrow. They may also help prevent the decelerator 36 from contacting the riser or arrow rest of the bow during launch, particularly on an older-style bow.

Figure 10:
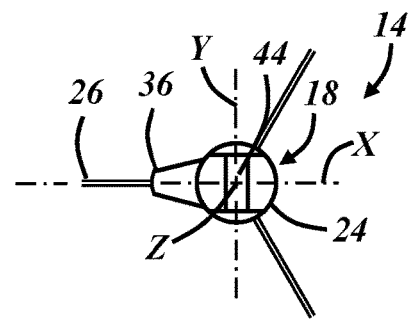
FIG. 10 is a rear view of the arrow with the tracking device of FIG. 9.

In particular, the angular location of the barb 36 may be such that the tracking device 18 can be installed in the arrow shaft with the barb generally aligned with one of the vanes 26 which is to be used as the index vane—i.e., the vane that points away from the bow when the arrow is loaded into the bow. FIG. 10 is a rear view of the tracking device 18 of FIG. 9 installed in the arrow shaft. In this view, the groove axis (Y) is oriented vertically and the decelerator 36 is at an angular position that is 90 degrees from the groove axis, where the angular position is measure about a longitudinal axis (Z) of the shaft and tracking device. Stated differently, the barb 36 extends in a direction perpendicular with the groove 44 in the direction of an X-axis.

In the illustrated example, the barb 36 has a tapered shape, with the base 38 being wider than the end 40 in the y-direction in the view of FIG. 10. The base 38 has an arc shape about the longitudinal axis (Z) that follows the contour of the body of the nock 24, and the distal end 40 has a lesser arc shape about the same axis. The illustrated shape and position of the barb 36 are non-limiting, and more than one barb may be included. Additional barbs or other counterweights may be used, such as for balance purposes. Alignment of the barb 36 with one of the vanes 26 as shown can help to reduce any negative aerodynamic effect caused by the barb. In some embodiments, the barb 36 is offset by 45 degrees or more from the groove axis (Y).

In this example, the barb 36 may be formed integrally as a single monolithic piece with the nock 24, from an injection molded plastic for example. The shape of the illustrated barb serves several useful functions. For example, the acute angle between the forward surface 42 of the barb 36 and the shaft has the effect of gathering tissue of the animal and pinching it between the barb and the body of the nock as the arrow proceeds through the animal. The gathered tissue can tear at a sufficiently high velocity, and the tearing action causes the deceleration effect—i.e., the tearing of the animal tissue requires energy which is taken from the kinetic energy of the arrow. More particularly, since the barb 36 is part of the tracking device 18, the necessary kinetic energy is selectively taken from the tracking device 18 to cause it to decelerate more than the remainder of the arrow while passing through the animal. When the drag force applied to the tracking device 18 exceeds its separation force from the arrow shaft, the tracking device becomes detached and remains with the animal, even if the remainder of the arrow proceeds entirely through the animal. The barb functions to increase this drag force, which, in addition to facilitating tracking device detachment, also expands the window for the designed separation force. In other words, the barb or other decelerator 36 allows the fit of the tracking device 18 within the diameter of the arrow shaft to be a tighter fit than would otherwise be functional.

In some embodiments, the barb 36 may be formed from a thin sheet of metal aligned with the vane 26 of the arrow. This configuration can further reduce drag during flight of the arrow toward the animal. In some embodiments, the barb 36 is intentionally made to be deformable. For example, the base 38 of the barb 36 could be made shorter in the Z-direction and/or narrower in the Y-direction to permit the barb to bend or flex and thereby further open the pinch point formed between the forward surface 42 and the shaft of the arrow. The effect is an even greater deceleration as the arrow passes through the animal.

Figure 11:
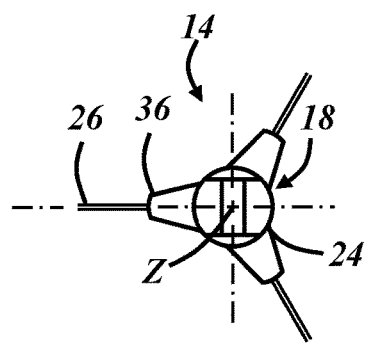
FIG. 11 is a rear view of the arrow in which the tracking device is equipped with a decelerator having three of the barbs of FIGS. 9 and 10.

FIG. 11 illustrates another example of the decelerator including a plurality of the same barbs 36 illustrated in FIGS. 9 and 10. As shown in this rear view of the arrow 14, three barbs 36 are evenly spaced about the axis (Z) of the tracking device 18, thus providing the decelerator with rotational symmetry and better balance. Each individual barb 36 is aligned with one of the vanes 26 in this example.

This and other decelerator configurations including multiple barbs or other deceleration features are useful with more modern hunting bows equipped with drop-away or similar arrow rests with which there is no concern about the vanes 26 touching anything other than the bow string during launch. When used with such bow configurations, there are no limits on the angular position of the decelerator 36 or any individual features (e.g., barbs) of the decelerator, and any number of barbs or other deceleration features can be used. The angular spacing between the individual deceleration features when multiple are used preferably provides rotational symmetry so as not to negatively affect the balance of the arrow.

Figure 12:
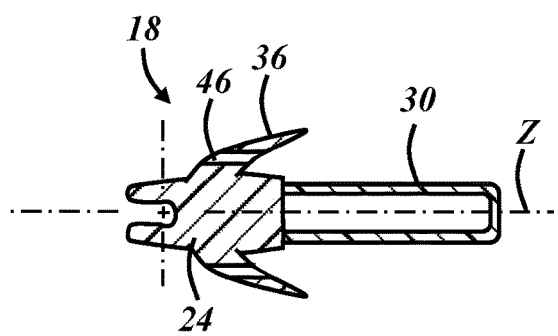
FIG. 12 is a top cross-sectional view of the tracking device equipped with a dish-shaped decelerator extending entirely around the nock.

In some embodiments, the decelerator 36 can extend 360 degrees around the longitudinal axis (Z). To illustrate one example, the decelerator 36 of FIG. 12 has a dish-shaped configuration in which the profile shape of the barb 36 of FIG. 9 is rotated about the Z-axis. This decelerator 36 is illustrated in cross-section with the nock 24 so the profile shape can be shown and further includes apertures 46 formed through the dish shape in the axial direction to reduce aerodynamic drag during flight. Such apertures 46 may be spaced about the Z-axis with rotational symmetry for balance purposes.

Figure 13:
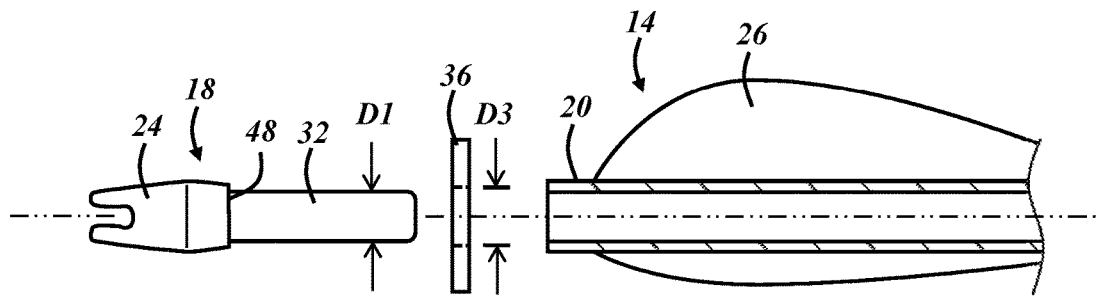
FIG. 13 is an exploded top view of the rear end of the arrow equipped with the tracking device of FIG. 6 and a removable and replaceable decelerator.
Figure 14:
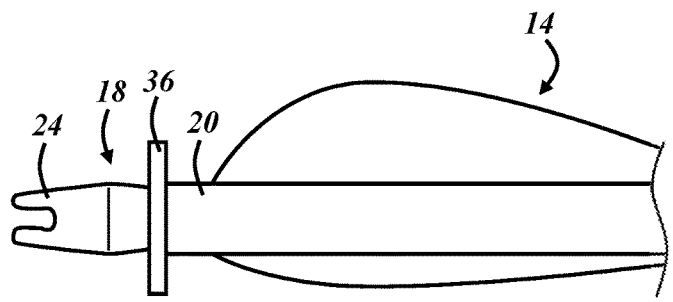
FIG. 14 is a top view of the rear end of the arrow of FIG. 13 when assembled.

FIG. 13 is an exploded view of the rear end of the arrow 14 with a removable and replaceable decelerator 36. The decelerator 36 in this example has a flat annular shape, similar to a washer, with an inner diameter D3 sized to fit around the outer diameter D1 of the electronics housing 32. When installed on the arrow 14, the decelerator 36 is sandwiched between a forward shoulder 48 of the nock 24 and the rear end of the arrow shaft 20, as shown in FIG. 14. The inner diameter D3 of the decelerator 36 is larger than the outer diameter D1 of the electronics housing 32, but smaller than the diameter of the nock 24 at the shoulder 48 and smaller than the outer diameter of the arrow shaft 20. This washer-style decelerator 36 has a relatively simple form that, while not necessarily having an aerodynamically preferred shape, is suitable to function as a decelerator once the arrow shaft 20 has pierced through the hide of the targeted animal and the decelerator 36 impacts the animal. The decelerator 36 can take nearly any form that extends radially from the body of the nock 24 and preferably has one or more stress-concentrators (e.g., barbs, points, serrations, narrow edges, etc.) along the forward-facing side of the decelerator so that the decelerator becomes embedded in the hide of the animal, even if it does not make it fully through the hide and inside the animal.

Figure 15:
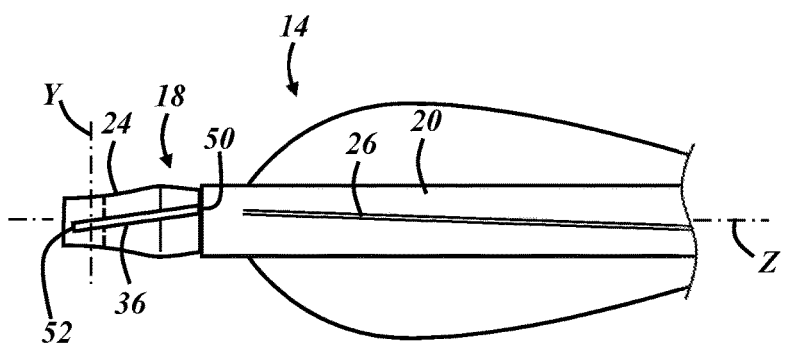
FIG. 15 is a side view of the tracking device attached to the arrow shaft and equipped with a decelerator in the form of an offset fin.
Figure 16:
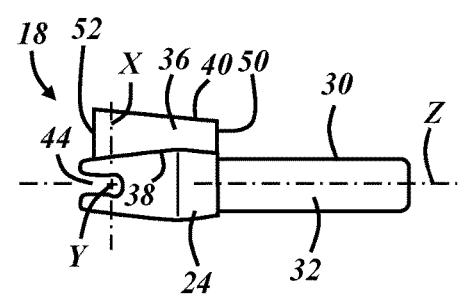
FIG. 16 is a top view of the tracking device of FIG. 11.

FIGS. 15 and 16 illustrate another example of the decelerator 36 in the form of one or more offset fins. FIG. 15 is a side view of the arrow 14 with the tracking device 18 installed in the shaft 20 and with the index vane 26 facing out of the page. FIG. 16 is a top view of the tracking device 18 of FIG. 15. Similar to the barb-type decelerator of FIGS. 9-11, the illustrated fin 36 is a projection extending from a base 38 at the main body of the nock 24 to a distal end 40. The fin 36 is also located along the nock 24 at the same angular position as the barb of FIGS. 9 and 10 with similar advantages for traditional style bows (i.e., bows without drop-away arrow rests or mechanical string release).

The fin 36 has front and rear edges 50, 52 with the end 40 being a third edge located directly over the base 38. The fin 36 has a uniform thickness, and the front and rear edges 50, 52 are offset from each other with respect to the longitudinal axis (Z). In other words, a line drawn between the front and rear edges of the fin 36 forms an oblique angle with the Z-axis. This angle is in a range between 0 and 90 degrees, preferably 45 degrees or less. In the fin 36 of FIG. 15, this angle is illustrated at about 8 degrees. The fin 36 may have a helical shape. The illustrated shape and position of the fin 36 are non-limiting, and more than one fin may be included. Additional fins or other counterweights may be used, such as for balance purposes. In some embodiments, a plurality of fins 36 are spaced about the Z-axis with rotational symmetry as with the barb-style decelerators of FIG. 11. The fins 36 may be formed integrally as a single monolithic piece with the nock 24, from an injection molded plastic for example, or they may be a separately attached piece or pieces, made from a different material, and/or be configured as a removable and replaceable piece as in FIGS. 13 and 14.

The offset or helical configuration of the fin 36 has the effect of providing a rotational force or torque on the tracking device 18 as the arrow 14 passes through the animal. In this example, when viewed from the rear, the torque applied to the tracking device 18 is in a counter-clockwise direction. This rotational force is also at the expense of forward velocity, which results in deceleration of the tracking device 18. In other words, the angled fin 36 converts a portion of the forward motion to angular motion, meaning that forward motion is slowed in combination with a twisting motion being applied. The combination of twisting and deceleration with respect to the arrow shaft 20 facilitates detachment of the tracking device 18 from the shaft. In the particular example of FIG. 15, the vanes 26 are offset vanes with about 2 degrees offset between the front and rear ends of the vanes. The ends of the vanes 26 are offset in the opposite direction from the ends of the fin 36 such that the vanes tend to cause the arrow 14 to rotate during flight in a clockwise direction, when viewed from the rear. The result is that the arrow 14 enters the animal while rotating in one direction, and then a torque is applied to the nock 24 in the opposite direction when the nock enters the animal. In addition to facilitating tracking device detachment, the offset fin 36 also expands the window for the designed separation force, making a tighter fit possible than would otherwise be functional.

In some embodiments, the decelerator may include a combination of features of the barb of FIGS. 9-11 and the offset fin of FIGS. 15 and 16. For example, the front edge 50 of the fin of FIGS. 15 and 16 could be made with an acute angle similar to the front-facing surface 42 of the barb of FIG. 9 to arrive at an offset barb. Other variations are possible, such as providing a plurality of offset fins extending radially from a ring as a single piece and sizing the ring to be removable and replaceable as in FIGS. 13 and 14.

The electronics portion 30 of the tracking device 18 is not described in great detail here, as tracking device electronics of various sorts that are sufficiently small to be housed within an arrow shaft are known. In general, the electronics portion 30 of the tracking device 18 may include a transmitter capable of emitting a detectable signal (e.g., a radio signal or an audible sound), an accelerometer and/or a shock sensor, a power source (e.g., a battery), a power switch, electronic memory, and/or a processor capable of gathering information from other electronic components and activating or deactivating other electronic components based on that information. The transmitter may be part of a wireless transceiver capable of sending and receiving electromagnetic wave-based communications and/or linking to a remote electronic device, such as a smartphone, WiFi router, or Bluetooth device. The controller can determine that the projectile has been launched based on output from the accelerometer or shock sensor, and the controller can then operate the transmitter or transceiver for tracking purposes. The transmitter may operate as a beacon, sending a locating signal that can be received by a remote device, such as a smartphone. The remote device can include location tracking software to allow a user to track the location of the tracking device. For instance, based on the received signal, the remote device can indicate a proximity of the remote device to the transmitter. Additionally or alternatively, the transmitter produces an audible sound that the hunter can listen for and move toward.

The electronics portion may in some cases include global positioning (GPS) components capable of determining the relative locations of GPS satellites and using those locations to determine the global coordinates of the tracking device for transmission from the transmitter. The accelerometer may be part of an inertial measurement unit (IMU) configured to use one or more gyroscopes in combination with one or more accelerometers to measure various motion characteristics, such as a linear acceleration and an angular velocity of the tracking device. These and/or other components of the electronics portion 30 of the tracking device 18 can be interconnected with each other on a printed circuit board (PCB), flex circuit, or other suitable configuration than can be supported in the housing 32.

It is to be understood that the foregoing is a description of one or more embodiments of the invention. The invention is not limited to the particular embodiment(s) disclosed herein. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A tracking device configured to detach from a launched projectile to remain in an animal when the projectile proceeds completely through the animal,
the tracking device further comprising a decelerator configured to decelerate the tracking device relative to the projectile while the projectile is proceeding through the animal,
wherein the tracking device is configured for attachment to an end of a shaft of an arrow and comprises a nock portion having a body and a groove formed in the body for operable engagement with a bow string used to launch the arrow, and
wherein the decelerator extends away from the body of the nock portion in a direction perpendicular with the groove.

2. An arrow comprising the tracking device of claim 1.

3. The tracking device of claim 1, further comprising a transmitter configured to transmit a detectable signal.

4. The tracking device of claim 3, further comprising a receiver configured to receive a signal transmitted from an electronic device.

5. The tracking device of claim 1, further comprising a sound generator.

6. The tracking device of claim 1, further comprising an accelerometer configured to detect when the projectile is launched and/or when the launched projectile hits the animal.

7. The tracking device of claim 1, further comprising an electronics portion that is housed within the shaft of the arrow when the device is attached to the end of the shaft.

8. The tracking device of claim 7, further comprising a sleeve that fits along a housing of the electronics portion to define an outer diameter that fits with an inner diameter of the shaft of the arrow.

9. The tracking device of claim 8, wherein the sleeve is removable and replaceable with a different sleeve to define a different outer diameter.

10. The tracking device of claim 1, wherein the tracking device is configured such that a longitudinal force required to detach the tracking device from the shaft is greater than a force required to detach the nock portion from the bow string.

11. The tracking device of claim 1, wherein the decelerator comprises a barb.

12. The tracking device of claim 1, wherein the decelerator comprises an offset fin.

13. The tracking device of claim 1, wherein the decelerator comprises a helical projection configured to cause the tracking device to rotate in a direction opposite from a direction of rotation of the launched projectile while the decelerator is proceeding through the animal.

14. The tracking device of claim 1, wherein the decelerator comprises a plurality of deceleration features extending radially from a body of the tracking device.

15. The tracking device of claim 1, wherein the decelerator has rotational symmetry about an axis of the tracking device.

16. The tracking device of claim 1, wherein the decelerator surrounds a housing of the tracking device.

17. A tracking device configured to detach from a launched projectile to remain in an animal when the projectile proceeds completely through the animal, wherein the projectile is an arrow comprising a shaft, the tracking device further comprising a decelerator configured to decelerate the tracking device relative to the projectile while the projectile is proceeding through the animal, wherein the decelerator surrounds a housing of the tracking device and fits between a shoulder of a nock and an end of the shaft.

18. The tracking device of claim 17, wherein the decelerator has a dish shape.

19. A tracking device configured to detach from a launched projectile to remain in an animal when the projectile proceeds completely through the animal, wherein the projectile is an arrow comprising a shaft, the tracking device further comprising a decelerator configured to decelerate the tracking device relative to the projectile while the projectile is proceeding through the animal, wherein the decelerator comprises an angled projection configured to cause a twisting motion to be applied to the tracking device with respect to the shaft of the arrow while the decelerator is proceeding through the animal.

20. The tracking device of claim 19, wherein the angled projection is a helical projection configured to cause the tracking device to rotate in a direction opposite from a direction of rotation of the launched projectile while the decelerator is proceeding through the animal.

* * * * *